United States Patent [19]
Petzi et al.

[11] Patent Number: 5,460,410
[45] Date of Patent: Oct. 24, 1995

[54] DEVICE FOR ADJUSTABLY MOUNTING A SEAT BELT FITTING TO A VEHICLE BODYWORK

[75] Inventors: Jürgen Petzi, Geislingen; Erwin Bühr, Schwäbisch Gmünd, both of Germany

[73] Assignee: TRW Repa GmbH, Alfdorf, Germany

[21] Appl. No.: 277,596

[22] Filed: Jul. 20, 1994

[30]     Foreign Application Priority Data

Jul. 30, 1993 [DE] Germany .................. 43 25 662.7

[51] Int. Cl.⁶ .................................................. B60R 22/00
[52] U.S. Cl. ..................... 280/801.2; 280/806; 280/808; 297/483
[58] Field of Search ........................ 280/801.2, 801.1, 280/808, 806; 297/483, 486

[56]            References Cited

U.S. PATENT DOCUMENTS

| | | | |
|---|---|---|---|
| 4,569,537 | 2/1986 | Else | 280/808 |
| 4,973,084 | 11/1990 | Biller | 280/808 |
| 4,989,900 | 2/1991 | Steinhuser | 280/806 |
| 5,167,428 | 12/1992 | Garret et al. | 280/808 |
| 5,186,495 | 2/1993 | Boumarafi et al. | 280/801.2 |
| 5,230,534 | 7/1993 | Boumarafi et al. | 280/901.2 |

FOREIGN PATENT DOCUMENTS

| | | | |
|---|---|---|---|
| 0133572 | 2/1985 | European Pat. Off. | 280/801.2 |
| 0150065 | 7/1985 | European Pat. Off. | 280/801.2 |
| 0249910 | 12/1987 | European Pat. Off. | 280/801.2 |
| 0370402 | 5/1990 | European Pat. Off. . | |
| 0376320 | 7/1990 | European Pat. Off. . | |
| 2664549 | 1/1992 | France . | |
| 2664548 | 1/1992 | France . | |

*Primary Examiner*—Kenneth R. Rice
*Assistant Examiner*—Christopher P. Ellis
*Attorney, Agent, or Firm*—Tarolli, Sundheim & Covell

[57]            ABSTRACT

In a device for height adjustment of a vehicular seat belt fitting a load-supporting guide rail (10) equipped for securing to the vehicle has a plurality of latching members (21) spaced in its longitudinal direction. In this guide rail (10) a carrier (12) is shiftably mounted, to which the seat belt fitting is secured. A latch bar (22) selectively latchable to the latching members (21) in this guide rail is mounted on the carrier. By the actuation of a release member (26) the latch bar (22) is releasable from the corresponding latching member (21). The latch bar (22) is mounted on the carrier (12) so that it can be swivelled about a swivel axis (A) which is at least more or less horizontal and its center of gravity (S) is displaced in the direction of the guide rail (10) relative to a plane (E) oriented parallel to the guide rail (10) and passing through the swivel axis (A). In the case of a sudden downwards movement of the carrier 12 due to a belt tensioning action, the latch bar (22) is displaced into its latching position due to its own inertia.

1 Claim, 4 Drawing Sheets

DEVICE FOR ADJUSTABLY MOUNTING A SEAT BELT FITTING TO A VEHICLE BODYWORK

FIELD OF THE INVENTION

The invention relates to a device for adjustably mounting a seat belt fitting to a vehicle bodywork.

DESCRIPTION OF THE PRIOR ARTS

Devices of this kind for adjusting the height of a seat belt fitting are known in many different embodiments, they permit adapting the height of the seat belt fitting, generally the deflector fitting in a three-point seat belt, to the bodily size of the vehicle occupant. By means of for instance a manually actuatable release member a latch of the device is moved out of engagement with a corresponding latching member of a guide rail until the latch is latched to a latching member at the desired height. If the procedure fails to be executed until latching occurs the latch may remain in an intermediate position between two latching members. This condition is uncritcal as long as it is assured that the latch latches at the next-lower latching member in downwards movement of the carrier. Such a movement of the carrier occurs in a three-point seat belt system as a result of the force component acting directly downwardly at the deflector fitting as long as the seat belt is stressed. But if the seat belt system is equipped with a belt tensioner engaging, for example, on the reel of the belt retractor the downwardly oriented force component occurring at the deflector fitting may assume extremely high values, because belt tensioning must be concluded within a few milliseconds and correspondingly high tensile stresses are introduced in the belt webbing. As a result of the acceleration occurring downwardly at the deflector fitting the carrier including the latch are accelerated to such an extent that the latch, if located in an intermediate position between two latching members, may be moved past the next lower-lying latching member and not blocked until having attained a lower latching member or even the end of the displacement travel. The deflector fitting is then no longer at the optimum height and the effect of the belt tensioner is partially lost.

SUMMARY OF THE INVENTION

By means of the invention a device for height adjustment of a vehicular seat belt fitting is provided which ensures by simple means that the latch is always blocked at the next-lower latching member during downwards movement of the carrier. The device of the invention comprises a guide rail for attachement to the vehicle bodywork and provided with a plurality of latching members spaced in a longitudinal direction of the rail. A carrier is mounted on the rail for sliding movement in the longitudinal direction and provided with fastening means for fastening the seat belt fitting on the carrier. A latch bar is pivotably mounted on the carrier between an engagement position adjacent to and in engagement with a selected one of the latching members and a release position out of engagement with the latching members. A release member is movably mounted on the carrier for pivoting the latch bar between its engagement and release positions. According to the invention the latch bar is mounted on the carrier so that it can be swivelled about a swivel axis which is at least more or less horizontal and its center of gravity is displaced in the direction of the guide rail relative to a plane oriented parallel to the guide rail and passing through the swivel axis. By these means the latch bar receives a forced swivelling movement in the direction of the bottom of the guide rail in the acceleration phase of the downwards movement of the carrier due to its inherent moment of inertia. This displacement of the center of gravity relative to the vertical plane running through the swivel axis produces a lever at which the moment of inertia of the latch bar is active and which generates a torsional moment causing the forced swivelling of the latch bar into the engaging position. The greater the acceleration occurring at the carrier and at the latch bar, the greater also the torque producing the forced swivelling. It is thus easily possible to configure the latch bar so that an adequately swift forced swivelling into the engaging position results even when the acceleration is the highest anticipated.

Preferably the latch bar is loaded by spring force in the direction towards the latching members so that only short distances between the latching position and the release position need to be overcome.

In one advantageous embodiment the latching members protrude from the flat bottom wall of the guide rail into the interior space thereof, and the latch bar is maintained in contact with the inside surface of the bottom wall of the guide rail by a spring. These means ensure that the latch bar, unless in contact with a latching member protruding from the bottom wall of the guide rail by its latching edge, locates the next-lower latching member even without swivelling when a downwards movement of the carrier occurs.

One particularly simple embodiment of the device necessitating only a slight depth of configuration results according to an advantageous embodiment in that the latch bar features a generally L-shaped part swivably mounted on the free end of its long arm on the carrier and carrying at the end of its short arm formed curved towards the bottom of the guide rail a latching projection curved slanting towards the bottom of the guide rail, at the free end of which, i.e. of the latching member a latching edge is formed.

BRIEF DESCRIPTION OF THE DRAWINGS

Further advantages and features of the invention will be evident from the following description and from the drawing to which reference is made and in which.

DESCRIPTION OF PREFERRED EMBODIMENTS

Figure 1:
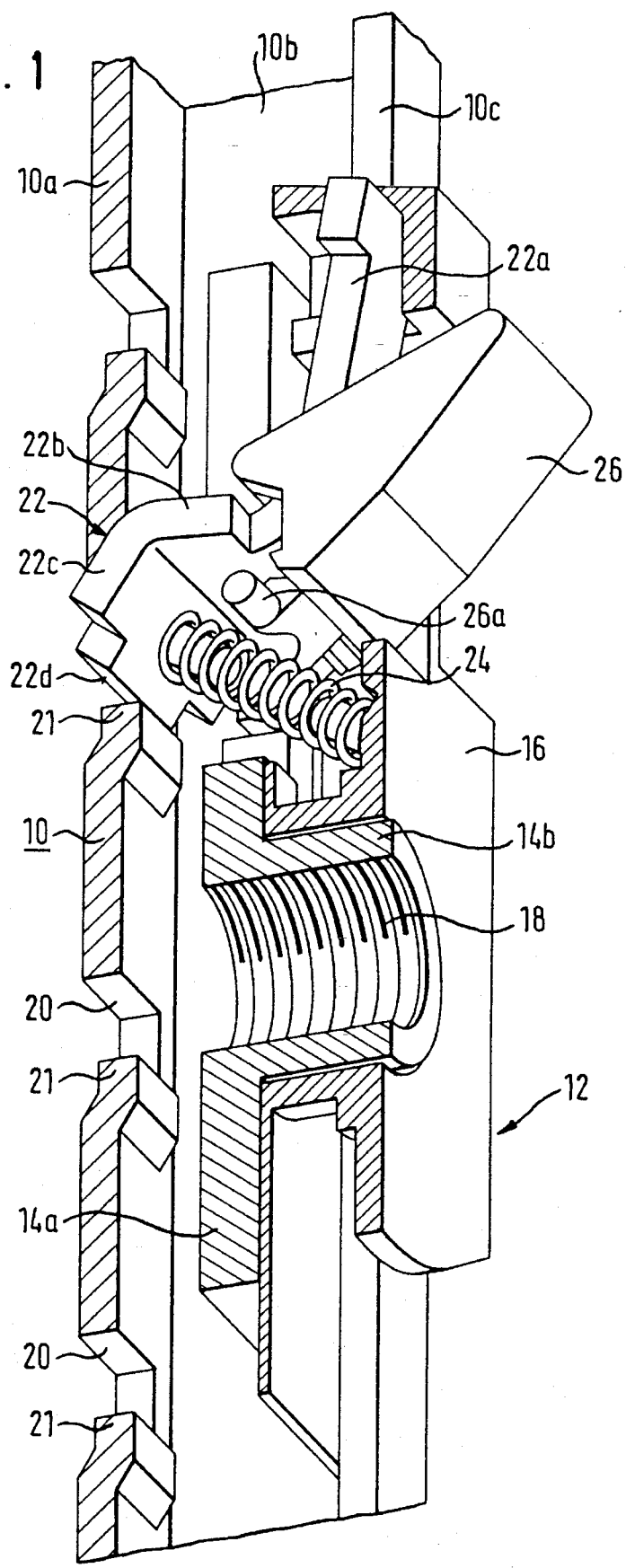
FIG. 1 is a perspective partial cut-open view of an embodiment of the device.

A guide rail 10 formed by a curved and stamped sheet-metal part is produced for anchoring to the center column of a vehicle. It is provided with a flat bottom wall 10a and side walls 10b curved perpendically from the latter, of which only one is shown in the drawing, including wings 10c curved at right angles and parallel to the bottom wall 10a, between which a gap is formed. In the guide rail 10 a carrier 12 for securing a deflector fitting (not shown) of a seat belt system shiftably mounted in the longitudinal direction. The carrier 12 is composed of a plate 14a having as molded bush 14b and a guide part 16 which grasps the wing 10c and is penetrated by the bush 14b. This bush 14b is provided with a threaded hole 18 for screwing in a threaded pin serving to secure the deflector fitting.

The guide rail 10 is provided with a series of rectangular openings 20 stamped out of the bottom wall 10a which are spaced equidistant in the longitudinal direction. In the installation position of the device the lower edge of each opening 20 is pronouncedly defined and protrudes as latching member 21 into the interior space of the guide rail 10. On the carrier 12 a latch bar 22 is pivotally mounted. This latch bar 22 has a generally L-shaped part having a long arm 22a, the free end of which is pivotally supported about an axis A in a groove 23 in the interior of the guide part 16, and a short arm 22b which is curved towards the bottom wall 10a of the guide rail 10 and which carries a latching projection 22c curved slanting towards the bottom of the guide rail 10, at the free end of which, i.e. of the latching projection a latching edge 22d is formed. By means of a compression spring 24 which is supported between the latching projection 22c and the guide part 16, the latch bar 22 is biased in the direction of the bottom of the guide rail 10.

On the carrier 12 a release member in the form of an actuating lever 26 is furthermore pivotally mounted. This actuating lever 26 engages the latch bar 22 to the rear thereof by means of two pegs 26a in contact with the long arm 22a of the latch 22 in the vicinity of the transition to the short arm 22b. By, for instance, manually swivelling the actuating lever 26 in the downwards direction the latch bar 22 is swivelled counter-clockwise and overcoming the force of the compression spring 24.

Figure 2:
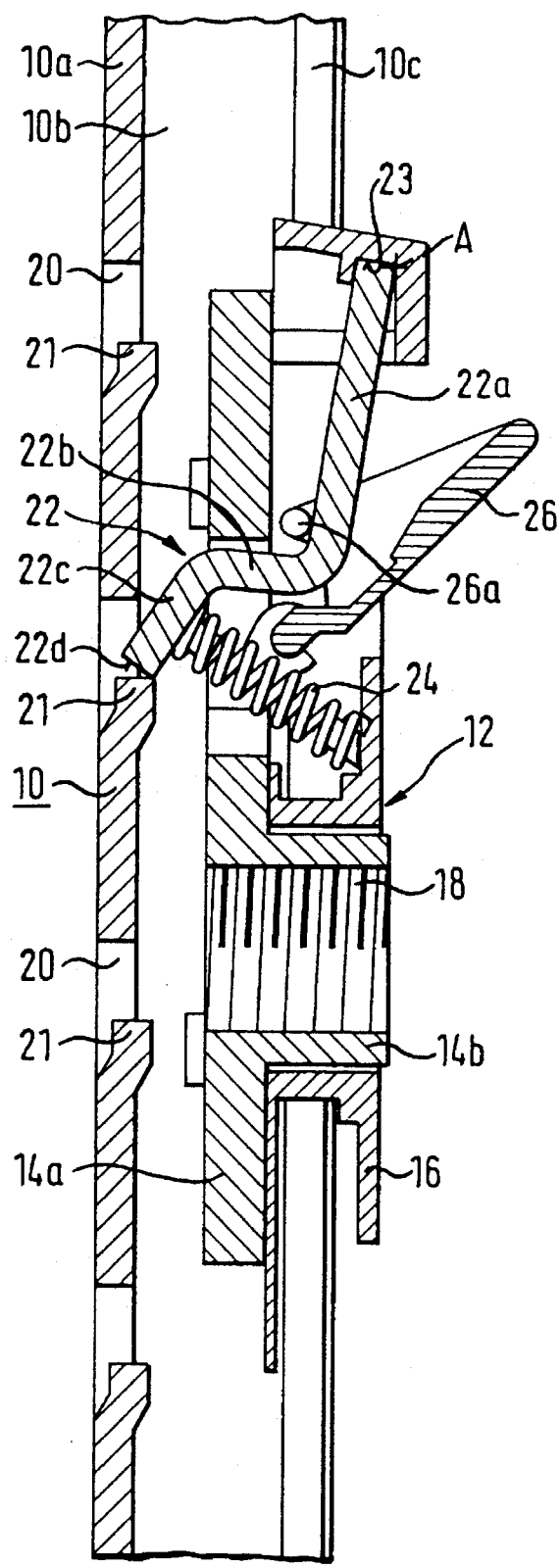
FIG. 2 is a longitudinal section through the device in a plane perpendicular to the bottom wall of the guide rail, the latch bar being shown here in its latched position.

FIG. 2 shows the latch bar in a latched position; the latching edge 22d is supported by one of the latching members 21.

Figure 3:
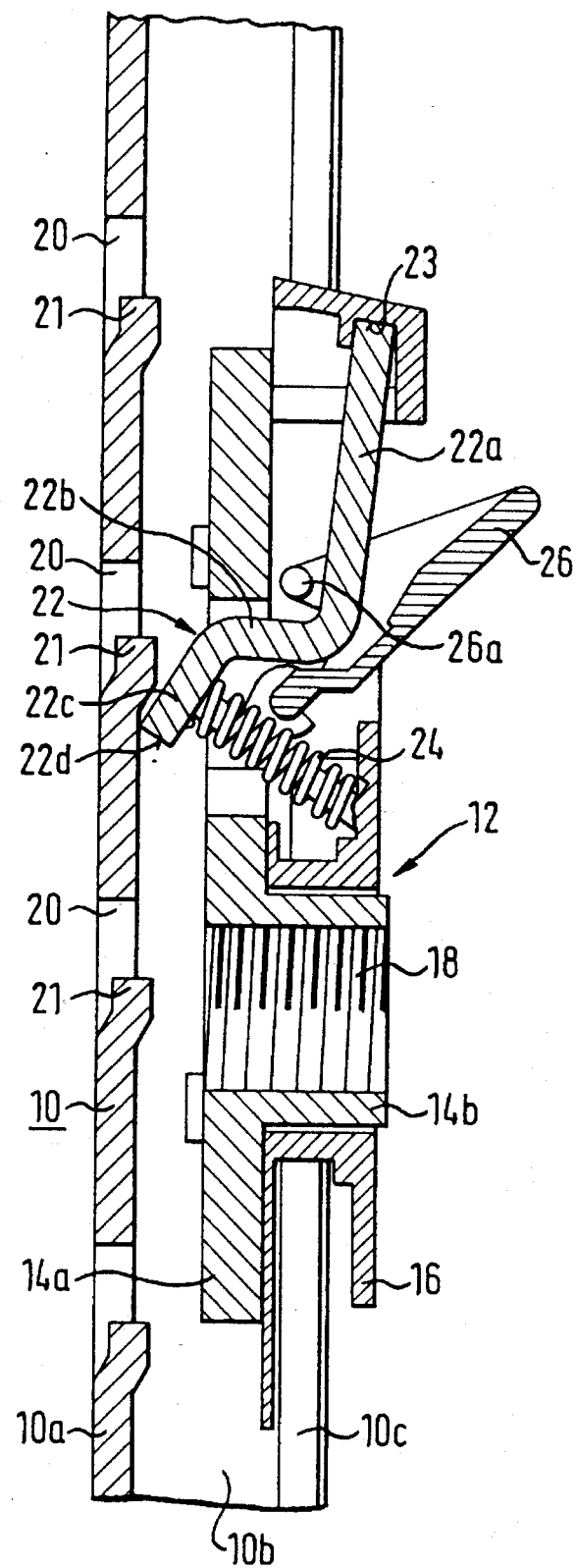
FIG. 3 is the same section view but with the latch bar shown in an intermediate position between two latching members.

In FIG. 3 the latch bar 22 is shown in an intermediate position between two latching members 21, it contacting directly below a latching member 21 the inside surface of the flat bottom wall 10a of the guide rail 10 by its latching edge 22d. If downwards movement of the carrier 12 in the guide rail 10 is produced in such a condition, it is ensured that the latching edge 22d of the latch bar 22 engages the next-lower latching member 21, since it is not necessary that the latch bar 22 be first swivelled in an engaging position.

Figure 4:
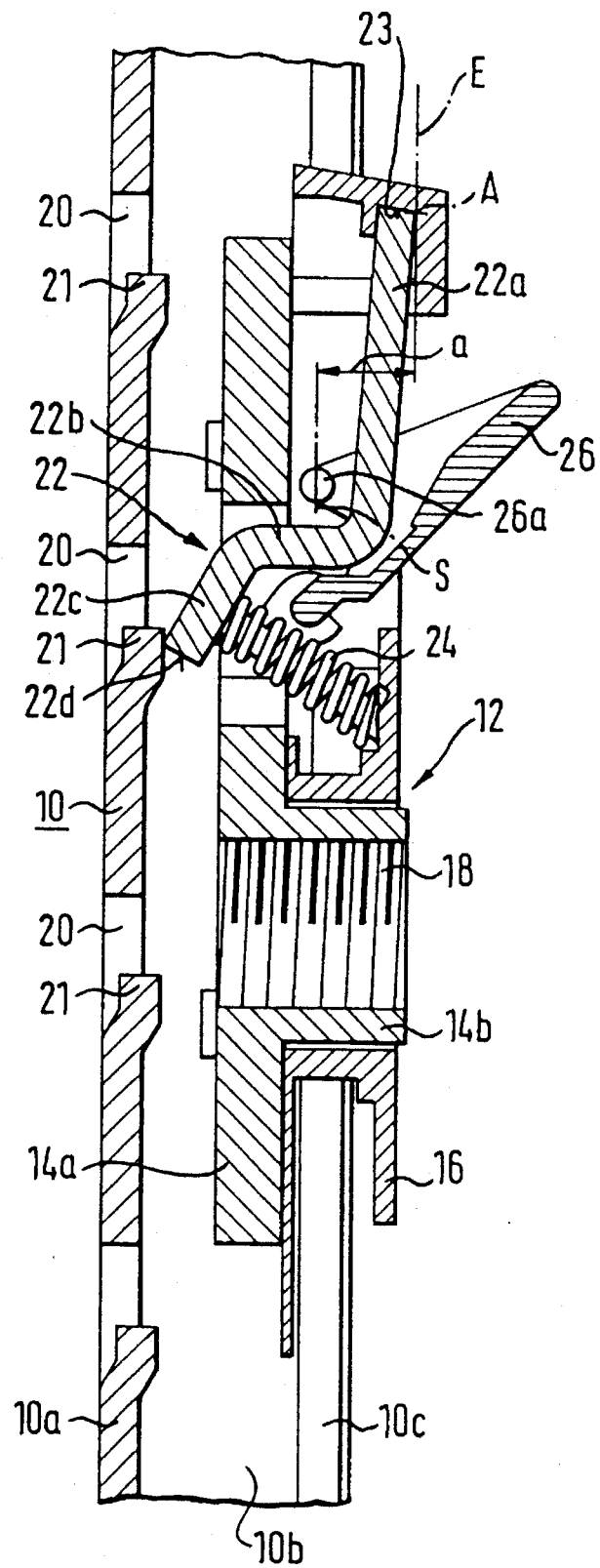
FIG. 4 is an analogous section view in which the latch bar is supported by its latching edge on a latching member.

In the condition shown in FIG. 4 the latch bar 22 is disposed, by contrast, in an intermediate position in which its latching edge 22d is supported directly below the corresponding edge of a latching member 21 on the inside surface thereof. To arrive at the next lower latching member from the aforementioned position the latch bar 22 must be swivelled clockwise or towards the bottom wall of the guide rail 10. To ensure that this swivelling movement occurs sufficiently swiftly even in the case of a sudden downwards movement of the carrier 12 due to a belt tensioning action, the center of gravity S of the latch bar 22 with respect to a plane E passing through the swivel axis A and parallel to the bottom wall of the guide rail 10, is displaced by a dimension a in the direction of the bottom wall. This dimension a corresponds to a lever with which the inertia of the latch bar 22 effective at the center of gravity S generates a torque about the swivel axis A by means of which the latch bar 22 receives the necessary swivel movement to move into engagement with the next-lower latching member 21 when a high acceleration occurs acting downwardly at the carrier 12 and at the latch bar 22. This swivel movement which is imparted to the latch bar 22 due to its inherent inertia is not obstructed by the actuating lever 26 since it is maintained in its lifted position due to the effect of the same acceleration so that the pegs 26a remain disengaged from the latch bar 22.

What is claimed is:

1. A device for adjustably mounting a seat belt fitting to a vehicle bodywork, comprising a guide rail for attachment to the vehicle bodywork and provided with a plurality of latching members spaced in a longitudinal direction of said rail, a carrier mounted on said rail for sliding movement in said longitudinal direction and provided with fastening means for fastening said seat belt fitting on said carrier, a latch bar pivotably mounted on said carrier about a substantially horizontal pivot axis between an engagement position adjacent to and in engagement with a selected one of said latching members and a release position out of engagement with said latching members, and a release member movably mounted on said carrier for pivoting said latch bar between its engagement and release positions, said latch bar has a center of gravity shifted towards said guide rail with respect to a plane passing through said pivot axis and parallel to said guide rail;

wherein said release member is an actuating lever pivotally mounted on said carrier in such a manner that upon acceleration of said carrier in a downward longitudinal direction when said latch bar is urged towards said latching members due to inertial forces, said actuating lever tends to move away from said latch bar due to inertial forces induced by said acceleration.

\* \* \* \* \*